United States Patent [19]
Sandulyak et al.
[11] Patent Number: 4,602,997
[45] Date of Patent: Jul. 29, 1986

[54] APPARATUS FOR SEPARATING FERROMAGNETIC MATERIALS FROM FLUID MEDIA

[75] Inventors: Alexandr V. Sandulyak; Vyacheslav I. Garaschenko; Vladimir V. Sandulyak; Oleg J. Korkhov, all of Rovno, U.S.S.R.

[73] Assignee: Ukrainsky Institut Inzhenerov Vodnogo Khozyaistva, Rovno, U.S.S.R.

[21] Appl. No.: 758,571

[22] Filed: Jul. 23, 1985

Related U.S. Application Data

[63] Continuation of Ser. No. 482,069, Apr. 5, 1983, abandoned.

[51] Int. Cl.[4] .......................... B03C 1/10; B01D 35/06
[52] U.S. Cl. ....................................... 210/222; 55/100; 210/236
[58] Field of Search ............... 210/222, 223, 243, 695, 210/236; 209/223 R, 232, 217; 55/100

[56] References Cited

U.S. PATENT DOCUMENTS

| | | | |
|---|---|---|---|
| 2,461,008 | 2/1949 | Stearns | 209/223 R |
| 3,375,925 | 4/1968 | Carpenter | 209/223 R |
| 4,054,513 | 10/1977 | Windle | 210/222 |
| 4,224,590 | 9/1980 | Spodig | 209/223 R |

FOREIGN PATENT DOCUMENTS

| | | | |
|---|---|---|---|
| 355415 | 8/1961 | Switzerland | 210/223 |
| 816974 | 7/1959 | United Kingdom . | |
| 624650 | 9/1978 | U.S.S.R. | 209/223 R |
| 698658 | 11/1979 | U.S.S.R. . | |
| 784894 | 12/1980 | U.S.S.R. . | |

*Primary Examiner*—Richard V. Fisher
*Assistant Examiner*—W. Gary Jones
*Attorney, Agent, or Firm*—Fleit, Jacobson, Cohn & Price

[57] ABSTRACT

Disclosed is an apparatus for separating ferromagnetic materials from fluid media which has stationary chambers containing a ferromagnetic filtering packing capable of being magnetized. The chambers, arranged pairwise, are provided with a self-contained means of magnetization, the magnetic circuit whereof comprises two opposite sections which are located on either side of a line through the centers of the chambers. Each of the sections is made up of a magnet and pole pieces arranged next to the chambers at the diametrically opposite ends of a line at right angles to the center line referred to above so that the two sections form a closed magnetic circuit in conjuction with the ferromagnetic packings.

6 Claims, 10 Drawing Figures

APPARATUS FOR SEPARATING FERROMAGNETIC MATERIALS FROM FLUID MEDIA

This application is a continuation of application Ser. No. 482,069, filed Apr. 5, 1983, now abandoned,

FIELD OF THE INVENTION

The present invention relates to apparatus for separating ferromagnetic materials from fluid media. It may find application in the chemical, heat power and engineering industries, metallurgy and elsewhere mainly in the form of fine filters intended to separate the products of corrosion, the grit resulting from wear, comminuted scale and the like from, for example, ammonia, ammonia liquor, alkalies, condensate, circulating water, oils, steam and other fluids.

BACKGROUND OF THE INVENTION

Known in the art are various apparatus known as magnetic filters or magnetic separators which are employed as fine filters to remove ferromagnetic particles from fluids.

Known is an apparatus (cf. USSR Inventor'Certificate No. 698,658, published on Nov. 25, 1979) incorporating a cylindrical housing comprising two chambers one of which, filled with a ferromagnetic filtering packing, is contained in a means of magnetization in the form of a solenoid. A negative side of the known apparatus is a significant demand for the winding wire of the magnetization system, for each turn of the solenoid is of a diameter equalling at least the outside diameter of the housing.

Known is another apparatus (cf. USSR Inventor's Certificate No. 784,894 of Dec. 7, 1980) comprising at least five or even six chambers rigidly attached to a common base plate in an imaginary circle. Interposed between the chambers packed with a ferromagnetic filtering material, there are electromagnets having straight cores contacting plates in a soft magnetic material which are attached to the chamber walls. The electromagnets alternate with the packed chambers, forming a closed circular magnetic circuit.

The disadvantage of this apparatus is poor maneuverability. Firstly, the existing plurality of chambers renders it suitable mainly for handling high flow rates; no disconnection of separate chambers can offer an economic gain because of the magnetic circuit being common for all the chambers. Consequently, no power saving can be obtained in this case. The fact that the magnetic circuit is common for all the chambers renders regeneration of the packing in some of the chambers impossible while the apparatus is in operation. Thus, unproductive down periods associated with the regeneration of the packing are unavoidable, making continuous filtration impossible. Secondly, the known apparatus is not fit for operation in explosive surroundings, e.g. in an ammonia plant, because of the winding. The use of explosion-proof permanent magnets, arranged to interrupt periodically the magnetic flux to which the packing is exposed, invites difficulties.

SUMMARY OF THE INVENTION

It is an object of the present invention to provide an apparatus for separating ferromagnetic materials which features a means of magnetization capable of handling various flow rates of the fluid filtered.

Another object of the present invention is to provide an apparatus for separating ferromagnetic materials which displays good maneuverability in, and adaptability to, various operating conditions.

A further object of the invention is to improve the quality of cleaning, operational reliability and economy.

Still another object of the invention is to provide an apparatus for separating ferromagnetic materials from fluid media, which can be readily used in explosive surroundings.

These and other objects are realized by the fact that in an apparatus for separating ferromagnetic materials from fluid media, incorporating paired stationary chambers containing a filter packing comprised of a ferromagnetic material capable of being magnetized and also inlet and outlet means, such as pipes, serving respectively to admit and discharge a fluid medium, according to the invention, each pair of the chambers is fitted with at least one separate means of magnetization, the magnetic circuit of which comprises a pair of opposite sections, each section comprising a magnet having one of a pair of pole pieces on each side thereof, the pair of opposite sections extending parallel to and on opposite sides of a plane through the longitudinal axes of each pair of chambers so that the two sections form a closed magnetic circuit in conjunction with the ferromagnetic filtering packing of the chambers.

In applications where either a hazard of explosion or a shortage of power may exist, it is expedient that permanent magnets be incorporated into the magnetic circuit of the means of magnetization and linked to the pole pieces with provision for disengagement therefrom so as to create the possibility of discontinuing the magnetic circuit and removing the magnetic field. To enable the disengagement of the permanent magnets from the magnetic circuit, a means for disengaging these magnets may be attached with provision for pivoting, as in a pivoting means, or, alternatively, they may be installed with provision for displacing at right angles to the chambers, as in a displacement means, e.g., by means of a trolley travelling along a line extending perpendicularly to said plane through the longitudinal axes of the chambers. To that end, the mating surfaces of the permanent magnets and the magnetic circuit are to be shaped either curvilinearly (in particular, cylindrically or conically) or flat. The attachment of the magnets of the magnetic circuit in the pivotal way or to the trolley may be effected with the aid of a ferromagnetic insert interposed between the permanent magnets and rigidly connected thereto. This arrangement will safeguard the permanent magnets against direct mechanical impact by the fasteners. Mechanical impacts at the joints between the magnets and magnetic circuit may be avoided by fitting the magnets with ferromagnetic strips.

In explosion-proof applications or when there is an opportunity to provide electromagnets and the rest of the electrical equipment in explosion-proof enclosures, it is expedient to fit the means of magnetization with windings, incorporating them into the magnetic circuit.

To adapt the disclosed apparatus for continuous filtration, each of the two chambers may be provided with a transverse partition dividing it into two spaces with separate inlets and outlets, the means of magnetization being provided in this case with a drive imparting thereto a reciprocating motion along the chambers.

The extremities of the magnetic circuit mating the walls of the chambers can be made flat. Also they may be shaped curvilinearly, preferably cylindrically, by virtue of, for example, cylindrical recesses provided in the end portions of either the magnets or the pole pieces or in the walls of the chambers.

To magnetize as much of the packing as possible, it is preferred to stagger with respect to each other the opposite sections of the means of magnetization located on either side of the chambers, substituting thus the so-called tangential magnetization—i.e., one when the lines of magnetic flux make acute angles with a transverse plane—for perpendicular magnetization.

In order to clean fluids at a high flow rate or clean several fluids having different composition before mixing them up, it is expedient to use a plurality of chambers arranged pairwise with individual means of magnetization provided at each pair. The chambers may be installed in a circular or comb-like pattern, using a common baseplate.

The advantage of this plan consists in that each pair of chambers with its means of magnetization is capable of operating as a self-contained unit, enhancing thus the maneuverability of the plant for the separation of ferromagnetic materials from fluid media. This implies, in the first place, that the apparatus is equally suitable for handling fluids in relatively small amounts, using just one pair of chambers, and for cleaning fluids in considerable amounts with the aid of several pairs of chambers located on the same baseplate. In the second place, this allows regeneration of the packing in the paired chambers in turns (i.e., regnerative shut-down) while the rest of chambers are on stream, enabling thus continuous filtration with just a pair of chambers out of the plurality on standby. In the third place, the procedure of cleaning several fluids of various composition at a time is simplified and so is the procedure of adjusting each pair of chambers for the handling of one or other fluid. In the fourth place, the apparatus appears to be suitable for operation in conjunction with the means of magnetization provided in more than one modification, i.e. one employing permanent magnets (for operation in explosive surroundings and in the event of power shortage) and the other incorporating electromagnets. In either case, the magnetic field can be easily removed from the zone of the packings, enabling thus their regeneration, by turning or displacing the permanent magnets or de-energizing the electromagnets. To ease the turning and displacing of the permanent magnets and protect them against mechanical damage, inserts and strips in a ferromagnetic material are resorted to. They also render the apparatus more dependable.

Another advantage of the disclosed apparatus resides in such a feature as the possibility of displacing the means of magnetization along the chambers. This paves the way to the tangential magnetization of the packing (the volume of the intensively activated packing, consequently, increasing) and the use of the same means of magnetization in order to magnetize in turns the packing contained in different lengths of the chambers. The result is improved maneuverability and economy of the apparatus. The point is that by dividing each chamber into two separate spaces it is possible to assign one pair of spaces for operation and the other for regeneration, changing their assignments after a period.

The present invention, as embodied in various modifications not limiting the scope thereof, will now be described in detail with reference to the accompanying drawings in which FIG. 1 is a general view of an apparatus for separating ferromagnetic materials from fluid media in accordance with the invention which incorporates two means of magnetization each showing permanent magnets in an operating condition;

DESCRIPTION OF PREFERRED EMBODIMENTS

Figure 1:
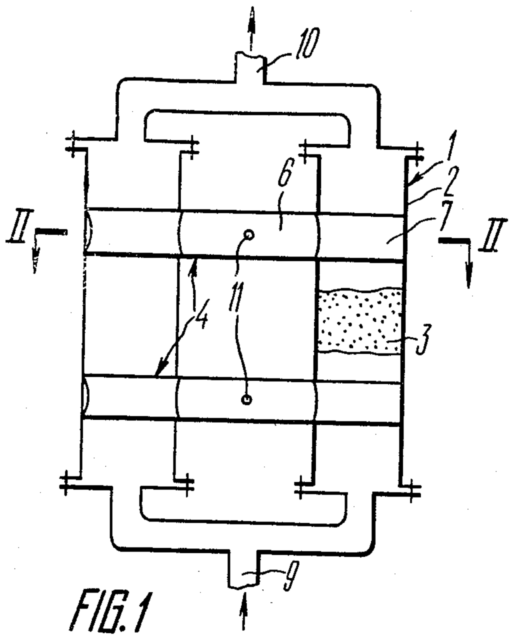

In what follows, the same reference numeral is used to denote each particular part in the drawings.

Figure 2:
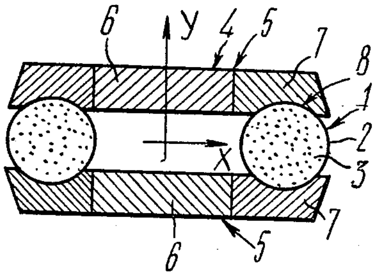
FIG. 2 is a sectional plan view of the apparatus illustrated in FIG. 1.
Figure 3:
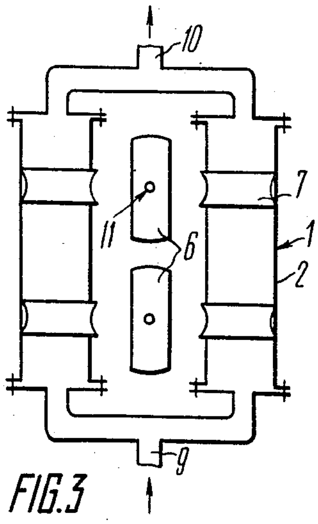
FIG. 3 shows the apparatus of FIG. 1 with the permanent magnets being turned so that the packing is no longer exposed to the effect of magnetization (regenerating condition)

It will be noted that FIGS. 1 and 2 depict a general view, partly cut away, and a sectional plan view, respectively, of an apparatus for separating ferromagnetic materials from fluid media according to the invention in an operating condition, i.e. with the magnetic circuit being closed so as to produce a magnetic field serving to remove the ferromagnetic particles from a fluid. FIG. 3 illustrates the same apparatus as set for the regeneration of the filtering packing when the magnetic circuit is open and no filtration is taking place.

The disclosed apparatus incorporates two identical stationary chambers 1 each comprising a housing 2 filled with a ferromagnetic packing 3 in the form of balls, comminuted chips and other ferromagnetic materials known to those versed in the art. The packing must also possess corrosion-inhibiting properties if the apparatus is intended for use as a fine filter. Each pair of the chambers 1 is provided according to the invention with a separate means 4 of magnetization, the magnetic circuit therefor being formed by two opposite sections 5 located at either side of a line through the centers of the chambers 1. A magnetic link-up between the sections 5 is established by way of the ferromagnetic packing 3 so that a closed magnetic circuit is set up.

Consider in more detail the construction of the sections 5 of the means 4 of magnetization. Each of the sections 5 comprises a permanent magnet 6 and ferromagnetic end portions or pole pieces 7. It goes without saying that laminated permanent magnets are as good as solid ones. As it can be seen from the drawing, the pole pieces are of identical design, are paired, and are located at the diametrically opposite sides of each chamber 1. Circular recesses 8 in the side surfaces of the pole pieces 7 serve to join same to the housings 2 of the chambers 1 and hold them fast thereto. Obviously, the same joint may be obtained by recessing the chambers and providing the pole pieces with mating projections (not shown). An inlet pipe 9 and an outlet pipe 10 are arranged to feed the fluid for treatment and to discharge it afterwards.

For a changeover from the operating condition shown in FIGS. 1 and 2 to the condition for regeneration, the magnetic circuit is discontinued by disengaging the permanent magnets 6 from the pole pieces 7. To that end, the permanent magnets 6 may be attached by pivots schematically shown at 11 which permit the magnets to be turned about the center of each permanent magnet 6 as shown in FIG. 3. A detailed description of the pivots has been intentionally omitted as being outside the scope of the invention, and it is at the owner's or designer's discretion to use any construction out of the host known. The permanent magnets 6 can be turned either by hand or by some actuator (not shown). FIG. 3 depicts the magnets being turned with respect to the Y-axis and, consequently, disengaged from the pole pieces 7 with the result that the magnetic field has ceased to exist and the apparatus is in the state of regeneration.

Figure 4:
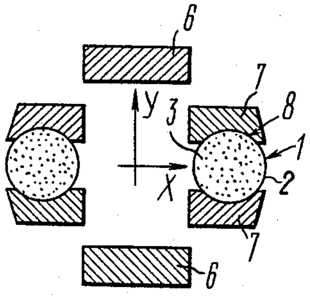
FIG. 4 is a sectional plan view of the apparatus illustrated in FIG. 1 with the permanent magnets being displaced so that the packing is free from the effect of magnetization (regenerating condition)

The disclosed apparatus for separating ferromagnetic materials from fluid media is provided in another modification shown in FIG. 4 in the state of regeneration. As can be seen, this modification is almost identical with the constructions illustrated in FIGS. 1–3 except that the permanent magnets 6 are attached to special trolleys (not shown) arranged to travel on rails (also not shown) at right angles to the line through the centers of the chambers 1 instead of being pivotally secured as in FIGS. 1 and 2. The displacement of the trolleys with the magnets in the indicated way closes and opens the magnetic circuit, setting the apparatus for operation and regeneration, respectively.

Figure 5:
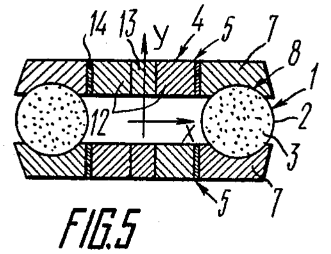
FIG. 5 is a sectional plan view of an apparatus according to the invention with ferromagnetic inserts interposed between the permanent magnets and ferromagnetic strips fitted at the end faces of these magnets incorporated into the magnetic circuit of the means of magnetization.
Figure 6:
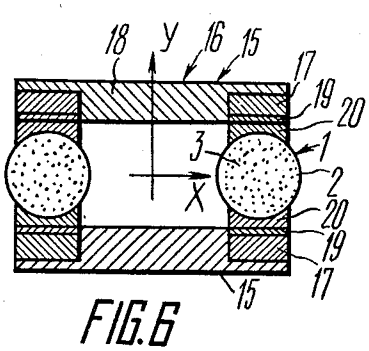
FIG. 6 is a sectional plan view of an apparatus according to the invention in another modification featuring permanent magnets located next to the chambers, extended ferromagnetic inserts and strips.

FIGS. 5 and 6 depict modifications of the means 4 of magnetization in sectional plan views which may be expedient for use instead of the means 4 of magnetization shown in FIGS. 1 and 2.

Referring to FIG. 5, the means 4 of magnetization comprises two opposite sections 5, each of which incorporates two permanent magnets 12 (laminated permanent magnets can also be used) interposed therebetween being a ferromagnetic insert 13 which is rigidly attached to the magnets 12. The pivoting assembly or the equipment used to displace the magnets 12 is attached to the insert 13 (see FIGS. 1 and 3). Ferromagnetic strips 14 rigidly secured to the end faces of the magnets are arranged to contact the pole pieces 7, preventing wear on the magnets thereby. The turning or displacing of the assembly incorporating the parts shown at 12 through 14 relative to pole pieces 7 is effected in the same way as shown in FIGS. 3 and 4.

The means of magnetization in the modification illustrated in FIG. 6 incorporates the same elements arranged, however, in a different way. The opposite sections 15 of the means 16 of magnetization incorporate permanent magnets 17 (laminated magnets may also be used), which are located next the housings 2 of the chambers 1 and are separated from each other by an extended ferromagnetic insert 18. Fitted to the end portions of the magnets 17 facing the housings 2 are ferromagnetic strips 19 which splitably join pole pieces 20. The turning or displacing of the assembly incorporating the parts shown at 17 through 19 with respect to the pole pieces 20 is effected in the same way as in FIGS. 3 and 4.

The movable assemblies of the means of magnetization with the permanent magnets which are illustrated in FIGS. 1 through 6 render the disclosed apparatus suitable for use under a variety of conditions, explosive atmosphere included. Moreover, the packing can be thoroughly regenerated at regular intervals by turning or displacing a certain assembly so as to remove the magnetizing force from the packing.

Figure 7:
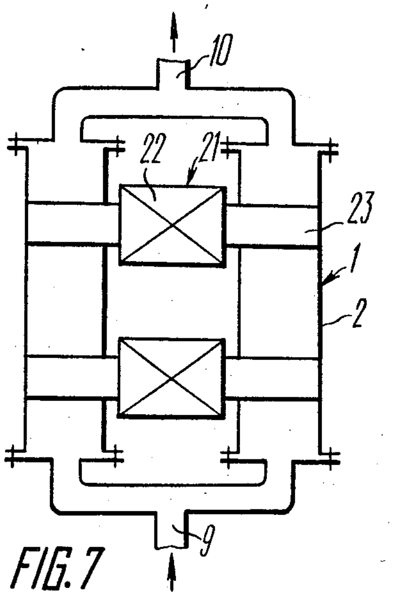
FIG. 7 is a general view of an apparatus according to the invention with two means of magnetization employing electromagnets.
Figure 8:
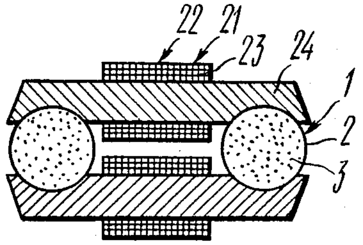
FIG. 8 is a sectional plan view of the apparatus illustrated in FIG. 7.

Depicted in FIGS. 7 and 8 are a general view and a sectional view in plan, respectively, of the disclosed apparatus in a modification featuring a means 21 of magnetization in which the opposite sections 22 incorporate windings 23, connected to a source of power, and cores 24. Although the cores are shown as being integral with the pole pieces, this does not imply that the two parts cannot be split.

Figure 9:
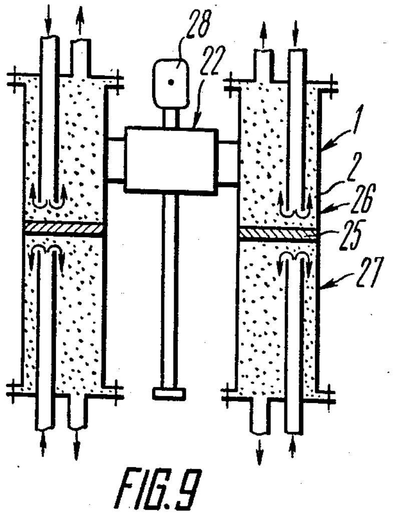
FIG. 9 is a general view of an apparatus in cross section having one means of magnetization fitted with provision for displacement along the chambers featuring transverse partitions.

Referring to FIG. 9, illustrated therein is a modification of the disclosed apparatus wherein the chambers 1 are provided with partitions 25 which form two spaces 26 and 27, each with a separate inlet and outlet for the fluid. The means 21 of magnetization shown, for example, in FIGS. 7 and 8, is arranged so as to be displaceable along the chambers by an electric motor 28 and a gear train. This arrangement provides for the regeneration of the packing in the lower spaces 27 while the upper spaces 26 are in operation and vice versa by appropriately positioning the means of magnetization 21.

Figure 10:
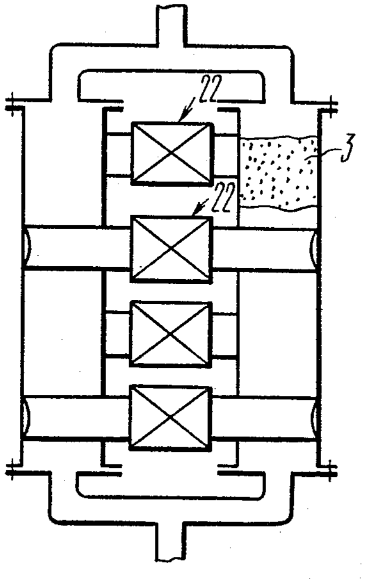
FIG. 10 is a general view of an apparatus with the opposite sections of the means of magnetization being displaced with respect to each other along the chambers.

Represented in FIG. 10 is the disclosed apparatus in a modification wherein the sections 22 of the means of magnetization also shown, for example in FIGS. 7 and 8, as displaced with respect to each other along the chambers 1 so as to give rise to a tangential magnetization of the packing 3.

As long as the apparatus, various modifications whereof have been described hereinabove, is in an operating condition, the fluid entering through the pipe 9 and passing through the magnetized filtering packing 3 is relieved of ferromagnetic particles and discharged thereafter (the inflow and outflow of the fluid being shown by arrows in relevant drawings). For the regeneration of a packing to take place, the flow of the fluid into the chamber is discontinued and the assembly incorporating the permanent magnets 6 (FIGS. 1–4) or 12 (FIG. 5) or 17 (FIG. 6) is either turned or displaced. Alternatively, the windings of the two sections 22 of the means of magnetization (FIGS. 7–10) are de-energized. The demagnetization which follows renders the packing incapable of attracting the ferromagnetic particles. On rinsing the sediment out of the apparatus, the operating cycle is repeated.

While in the foregoing description there preferred modifications of the apparatus for separating ferromagnetic materials from fluid media have been described, it is understood that various other modifications, within the spirit of the invention as defined by the claims which will follow, may occur to those skilled in the art. So, by way of illustration, coming within the scope of the invention is a setup comprising a plurality of paired chambers with individual means of magnetization located on the same baseplate and connected by their outlet pipes to a common manifold.

What is claimed is:

1. An apparatus for separating ferromagnetic materials from fluid media comprising:

means defining two spaced apart chambers, said chambers having parallel longitudinal axes with each chamber having a bed of magnetizable ferromagnetic filtering material therein, each chamber having a pole piece on diametrically opposite sides thereof so that there are two spaced apart pole pieces on opposite sides of a plane that extends through said parallel axes, a magnet connecting the two spaced apart pole pieces that are on the same side of a plane that extends through said axes, each magnet and connected pole pieces forming a section of a magnetizing means with said sections being spaced apart and parallel to one another, said sections of said magnetizing means cooperating with said ferromagnetic filtering material of said chambers to form a closed magnetic circuit, and inlet and outlet means communicating with said spaced apart chambers to convey and remove fluid media.

2. An apparatus as claimed in claim 1, wherein the magnet of each of said sections of the magnetizing means comprises a permanent magnet and includes a disengaging means which is associated with each of said magnets and, consequently, opening said magnetic circuits by breaking the magnetic portions thereof by either turning the magnet crosswise with respect to the original circuit or moving the magnet along the line normal to said plane.

3. An apparatus as claimed in claim 1, wherein said magnet of each section comprises a periodically operating electromagnet the core of which is an integral part of the pole pieces and which is partially surrounded by a winding.

4. An apparatus as claimed in claim 1, including partition means located within each tube and being transverse to the longitudinal axis of each chamber to divide each of said chambers into two parts, with each part having inlet and outlet means for fluid.

5. An apparatus as claimed in claim 4 wherein said magnetizing means is capable of reciprocating movement along the line parallel to said longitudinal axes from one part of said chamber to the other.

6. An apparatus as claimed in claim 4, wherein each of said sections of said magnetizing means can be displaced with respect to one another along the longitudinal axes of said chambers thereby providing for tangentially biased magnetization of said filtering material.

* * * * *